(12) United States Patent
Taylor et al.

(10) Patent No.: US 9,374,393 B2
(45) Date of Patent: *Jun. 21, 2016

(54) SYSTEM AND METHOD FOR DYNAMIC CALL-PROGRESS ANALYSIS AND CALL PROCESSING

(75) Inventors: Jonathan Robert Taylor, Orlando, FL (US); Ryan Stephen Campbell, Orlando, FL (US); Robert J. Auburn, Orlando, FL (US); Alexander S. Agranovsky, Orlando, FL (US); Robbie A. Green, Apopka, FL (US)

(73) Assignee: Aspect Software, Inc., Chelmsford, MA (US)

( * ) Notice: Subject to any disclaimer, the term of this patent is extended or adjusted under 35 U.S.C. 154(b) by 391 days.

This patent is subject to a terminal disclaimer.

(21) Appl. No.: 13/571,198

(22) Filed: Aug. 9, 2012

(65) Prior Publication Data

US 2012/0300913 A1    Nov. 29, 2012

Related U.S. Application Data

(63) Continuation of application No. 12/196,094, filed on Aug. 21, 2008, now Pat. No. 8,243,889.

(60) Provisional application No. 60/957,665, filed on Aug. 23, 2007.

(51) Int. Cl.
*H04M 11/00* (2006.01)
*H04L 29/06* (2006.01)
(Continued)

(52) U.S. Cl.
CPC ......... *H04L 65/1096* (2013.01); *H04M 3/4938* (2013.01); *H04M 3/5158* (2013.01); *H04M 2203/2027* (2013.01)

(58) Field of Classification Search
USPC ............ 379/69, 88.02, 88.18, 266.07, 88.01, 379/88.03, 88.04, 201.06, 201.07, 207.02, 379/201, 266.08, 88.06, 88.17, 93.01
See application file for complete search history.

(56) References Cited

U.S. PATENT DOCUMENTS 6,208,970 B1 *   3/2001   Ramanan ...................... 704/270
6,226,360 B1 *   5/2001   Goldberg et al. ............... 379/69
(Continued)

FOREIGN PATENT DOCUMENTS

EP           1 936 933 A      6/2008
WO         WO 02/19317 A      3/2002

OTHER PUBLICATIONS

EPO/ISA, "Notification of Transmittal of the Internation Search Report and the Written Opinion of the International Searching Authority, or the Declaration," corresponding International Patent Application No. PCT/US2008/074101, mailed on Dec. 12, 2008, 15 pages.

*Primary Examiner* — Maria El-Zoobi
(74) *Attorney, Agent, or Firm* — Husch Blackwell LLP

(57) ABSTRACT

A telephony application such as an interactive voice response ("IVR") needs to identify quickly the nature of the call (e.g., whether it is a person or machine answering a call) in order to initiate an appropriate voice application. Conventionally, the call stream is sent to a call-progress analyzer ("CPA") for analysis. Once a result is reached, the call stream is redirected to a call processing unit running the IVR according to the analyzed result. The present scheme feeds the call stream simultaneous to both the CPA and the IVR. The CPA is allowed to continue analyzing and outputting a series of analysis results until a predetermined result appears. In the meantime, the IVR can dynamically adapt itself to the latest analysis results and interact with the call with a minimum of delay.

17 Claims, 8 Drawing Sheets

(51) Int. Cl.
*H04M 3/493* (2006.01)
*H04M 3/51* (2006.01)

(56) References Cited

U.S. PATENT DOCUMENTS

| | | | |
|---|---|---|---|
| 6,850,602 B1 * | 2/2005 | Chou | 379/80 |
| 6,922,411 B1 | 7/2005 | Taylor | |
| 7,184,539 B2 * | 2/2007 | Colson et al. | 379/265.01 |
| 7,386,101 B2 * | 6/2008 | Pugliese | 379/69 |
| 2001/0017913 A1 | 8/2001 | Tuttle et al. | |
| 2003/0081756 A1 | 5/2003 | Chan et al. | |
| 2004/0202293 A1 * | 10/2004 | Pugliese | 379/88.01 |
| 2005/0276390 A1 | 12/2005 | Sikora et al. | |

* cited by examiner

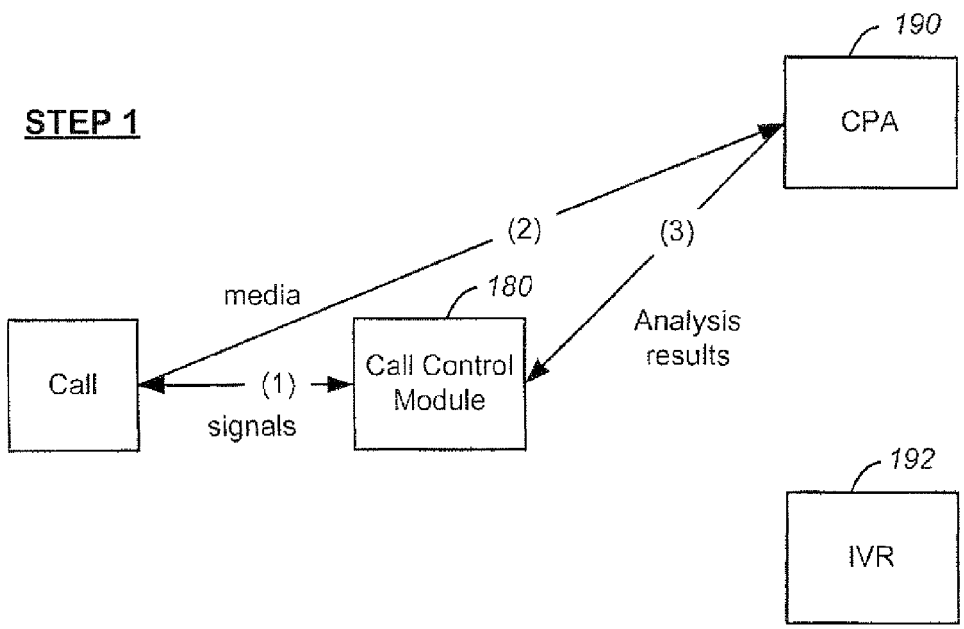
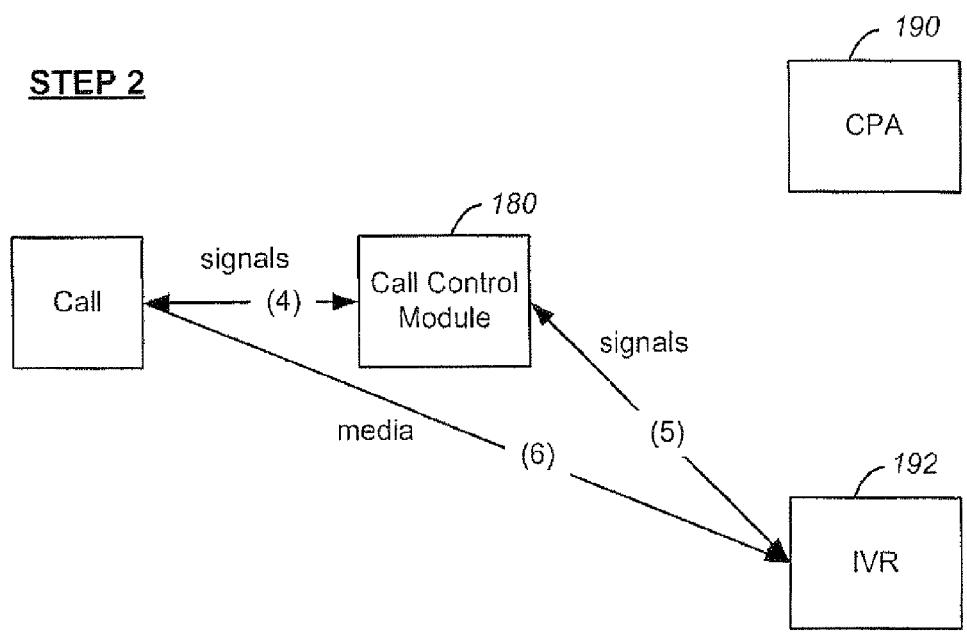
*FIG. 2* (Prior Art)

FIG. 3  *(Prior Art)*

SYSTEM AND METHOD FOR DYNAMIC CALL-PROGRESS ANALYSIS AND CALL PROCESSING

CROSS-REFERENCE TO RELATED APPLICATION

This application is a continuation of U.S. patent application Ser. No. 12/196,094, filed Aug. 21, 2008, which claims the benefit of U.S. Provisional Patent Application No. 60/957,665, filed Aug. 23, 2007 of Jonathan Robert Taylor, Ryan Stephen Campbell, R J Auburn, Alex. S. Agranovsky and Robbie A. Green, which applications are incorporated herein in their entirety by this reference.

FIELD OF THE INVENTION

The present invention relates to telecommunication and a networked computer telephony system including the Internet and the Public Switched Telephone System, and more particularly to improved call processing that is dependent on call-progress analysis.

BACKGROUND OF THE INVENTION

Two major telecommunication networks have evolved worldwide. The first is a network of telephone systems in the form of the Public Switched Telephone System (PSTN). This network was initially designed to carry voice communication, but later also adapted to transport data. The second is a network of computer systems in the form of the Internet. The Internet has been designed to carry data but also increasingly being used to transport voice and multimedia information. Computers implementing telephony applications have been integrated into both of these telecommunication networks to provide enhanced communication services. For example on the PSTN, computer telephony integration has provided more functions and control to the POTS (Plain Old Telephone Services). On the Internet, computers are themselves terminal equipment for voice communication as well as serving as intelligent routers and controllers for a host of terminal equipment.

The Internet is a worldwide network of IP networks communicating under TCP/IP. Specifically, voice and other multimedia information are transported on the Internet under the VoIP (Voice-over-IP) protocol, and under the H.323 standard that has been put forward for interoperability. Another important implementation of VOIP protocol is SIP ("Session Initiation Protocol".)

The integration of the PSTN and the IP networks allows for greater facility in automation of voice applications by leveraging the inherent routing flexibility and computing accessibility in the IP networks.

Interactive Voice Response ("IVR") is a technology that automates interaction with telephone callers. Enterprises are increasingly turning to IVR to reduce the cost of common sales, service, collections, inquiry and support calls to and from their company.

Historically, IVR solutions have used pre-recorded voice prompts and menus to present information and options to callers, and touch-tone telephone keypad entry to gather responses. Modern IVR solutions also enable input and responses to be gathered via spoken words with voice recognition.

IVR solutions enable users to retrieve information including bank balances, flight schedules, product details, order status, movie show times, and more from any telephone.

Additionally, IVR solutions are increasingly used to place outbound calls to deliver or gather information for appointments, past due bills, and other time critical events and activities.

One issue that arises from an IVR making an outbound call is to determine the type of receiver who might pick up the call. For example, the receiver may be human or a voice mailbox or an answering machine. Each type of receiver may require a different type of interactive exchange.

This type of issue is commonly tackled by the implementation of call progress analysis ("CPA"). For example, a call progress analysis module initially analyzes the media stream of the call to determine the nature of the receiver. The analysis is performed by analyzing a number of attributes such as the absence or presence of certain analog tones, and their duration and cadence and also the stage the call is in. In this case, an answering machine at the receiving end may be identified by its signature beep before it started recording.

However, even if a conventional CPA is able to distinguish between the different types of receivers, there are still timing issues associated with human interface. Usually it takes some time to identify an answering machine by its signature beep. The machine will play a series of identifying messages and voice prompts before signifying with a beep to being recording a voice message. If the receiver is human, the wait for the IVR to identify a possible beep may be too long. The human receiver will become impatient or think there is something wrong with the connection and hang up the line. On the other hand, if the receiver is inaccurately identified as human so that the IVR interacts promptly, it will be a problem later when the receiver actually turns out to be an answering message machine. In this ease, the IVR application may have already played a portion or even the entire message by the time the answering machine is ready to record it.

There is a need to improve the interaction with the recipient of an IVR call.

SUMMARY AND OBJECTS OF THE INVENTION

A telephony application such as an interactive voice response ("IVR") needs to identify quickly the nature of the call (e.g., whether it is a person or machine answering a call) in order to initiate an appropriate voice application. Conventionally, the call stream is sent to a call-progress analyzer ("CPA") for analysis. Once a result is reached, the call stream is redirected to a call processing unit running the IVR according to the analyzed result.

The present scheme feeds the call stream simultaneous to both the CPA and the IVR. The CPA is allowed to continue analyzing and outputting a series of analysis results until a predetermined result appears. In the meantime, the IVR can dynamically adapt itself to the latest analysis results and interact with the call with a minimum of delay.

In a preferred embodiment, a call control module directs the media stream of the call to the CPA to obtain a series of analysis results over time. Concurrently, the call control module relates the analysis results and the media stream to a call processing module running an IVR. The IVR is constantly adapting to the latest analysis result received in order to process the call appropriately and with a minimum of delay.

In one embodiment, the latest analysis result may result in a new session of voice application being initialized to replace an existing one.

In another embodiment, the latest analysis result may result in the operating parameters of an existing session of voice application being adjusted.

Additional objects, features and advantages of the present invention will be understood from the following description of its preferred embodiments, which description should be taken in conjunction with the accompanying drawings.

BRIEF DESCRIPTION OF THE DRAWINGS

FIG. 2 illustrates schematically a conventional implementation of call progress analysis.

DESCRIPTION OF THE PREFERRED EMBODIMENTS

Figure 1:
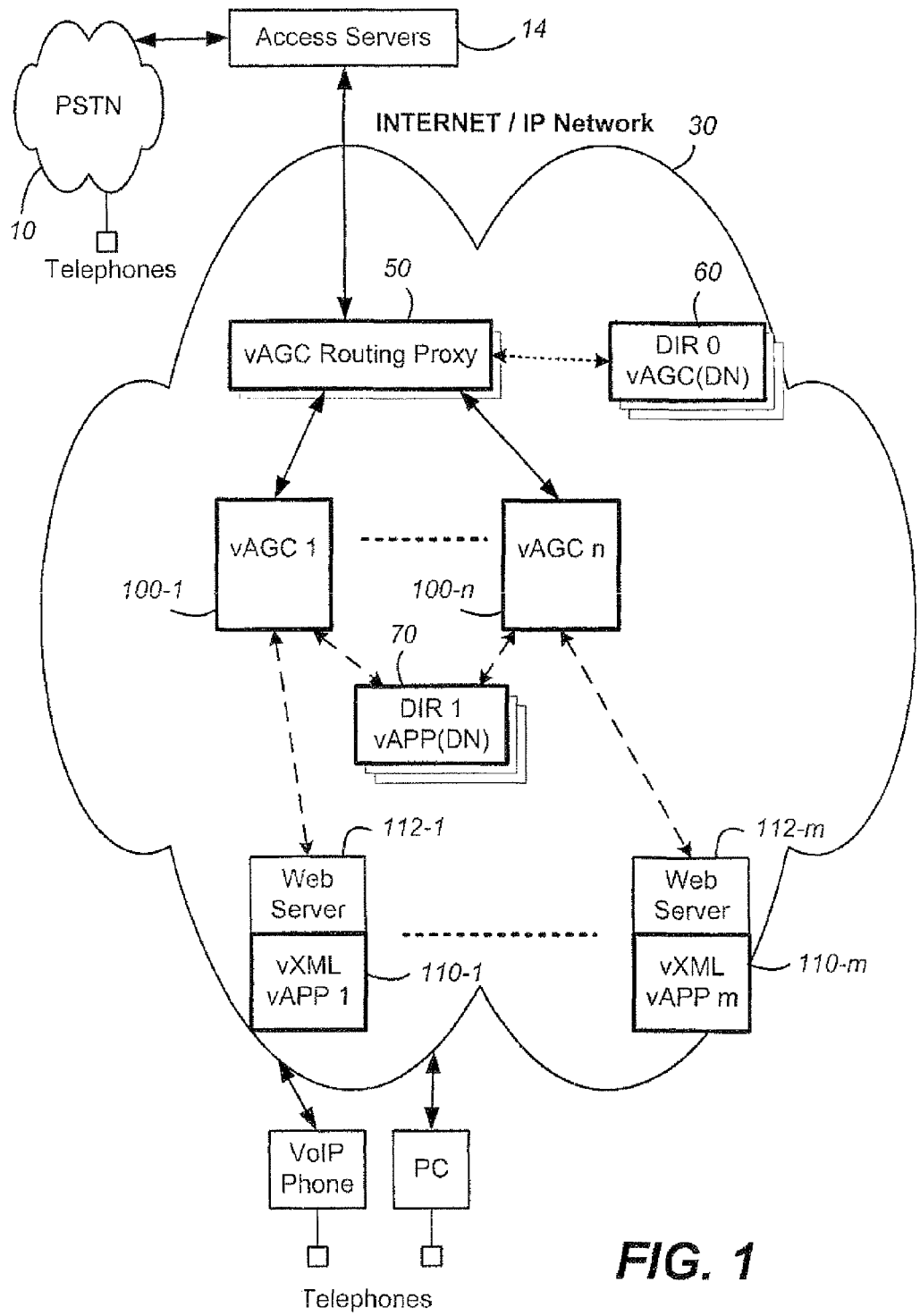
FIG. 1 illustrates a preferred network configuration including the PSTN and the Internet for practicing the invention.

FIG. 1 illustrates a preferred network configuration including the PSTN and the Internet for practicing the invention, The PSTN 10 is a network of telephones connectable by switched circuits and the Internet 30 is a network of IP devices and resources communicating by IP packets.

A plurality of voice applications scripted in vXML 110-1 to 110-m is hosted by corresponding web servers 112-1 to 112-m and is accessible on the Internet. These applications are coded in XML scripts that also contain custom telephony XML tags. The vXML scripts allow complete telephony applications to be coded.

A plurality of voice application gateway centers ("vAGC') 100-1, 100-n (also referred to as "voice centers") is deployed on the Internet. Each vAGC 100 essentially serves as a "browser" for one of the vXML voice applications and processes a received call by executing an appropriate vXML script.

Each Application Gateway Center (vAGC) 100 is a call-processing center on the Internet 30 for intercepting and processing calls to any one of a set of designated telephone call numbers. The calls may originate or terminate on any number of interconnected telecommunication networks including the Internet 30, the PSTN 10, and others (not shown) such as wireless networks.

One or more access servers 14 route calls between the PSTN and the Internet. The access servers are able to route a call to a destination vAGC on the Internet/IP network after a directory lookup. In the preferred embodiment, a group of vAGC routing proxy 50 such as SIP registrar servers are employed to perform the routing on the Internet/IP network. In that case, the access server relates the call to one of the vAGC routing proxy servers. As different LECs may set up access servers with varying amount of features and capabilities, it preferable for voice centers to rely on the group of vAGC routing proxy servers with guaranteed specification and capabilities to do the final routing.

Each vAGC 100 processes a call according to the telephony application (vAPP) associated with the called number. When a call is directed to the Internet, the access server 14 looks up the address of a destination vAGC in a directory, DIR0 60, and routes the call to the destination vAGC.

The directory DIR0 enables a list of vAGC to be looked up by dialed number. When a call to one of the designated dialed numbers is made from the PSTN, it is switched to the access server 12 and a lookup of the directory DIR0 allows the call to be routed to vAGC 100 for processing. Similarly, if the call originates from one of the terminal equipment (e.g., a PC 40 or a VOIP phone 42) on the Internet, a directory lookup of DIR0 provides the pointer for routing the call to one of the vAGCs.

Once the vAGC has received the call, it looks up another directory, DIRT 70 for the URL of the vXML application associated with the called or dialed number. Thus, the plurality of telephony applications vAPP 110-1, . . . , 110-m, each associated with at least one designated call number, is accessible by the vAGC from the Internet. After the particular vXML is retrieved by the looked up URL, the vAGC then executes the vXML script to process the call.

The directory DIR1 provides the network address of the various applications. When a vAGC 100 receives a call, it uses the call number (or dialed number "DN") to look up DIR1 for the location/address (whether a URL or an IP address or some other location method) of the vAPP associated with the DN. The vAGC 100 then retrieves the vXML web application and executes the call according to the vXML scripts.

A similar networked computer telephony system is disclosed in U.S. Pat. No. 6,922,411, the entire disclosure is incorporated herein by reference.

In operation, when a call is made to a dialed number (DN) registered as one of the numbers handled by the vAGC, it is routed to a vAGC such as vAGC 100 after a lookup from DIR0. The vAGC 100 initiates a new session for the call and looks up DIR1 for the net address of the telephony application vAPP 110 associated with the DN. The vAGC 100 retrieves vAPP 110 and proceeds to process the vXML scripts of vAPP 110.

For example, the vXML scripts may dictate that the new call is to be effectively routed back to the PSTN to a telephone 13 on another local exchange. In another example, the vXML scripts may dictate that the call is to be effectively routed to a VoIP phone 15 on the Internet. In practice, when connecting between two nodes, the vAGC creates separate sessions for the two nodes and then bridges or conferences them together. This general scheme allows conferencing between multiple parties. In yet another example, the vXML scripts allows the call to interact with other HTML applications or other back-end databases to perform on-line transactions.

Thus, the present system allows very powerful yet simple telephony applications to be built and deployed on the Internet. Many of these telephony or voice applications fall into the category of interactive voice response ("IVR") applications. The following are some examples of voice applications.

A "Follow me, find me" application sequentially calls a series of telephone numbers as specified by a user until one of the numbers answers and then connects the call. Otherwise, it does something else such as takes a message or sends e-mail or sends the call to a call center, etc.

In another example, a Telephonic Polling application looks up from a database the telephone numbers of a population to be polled. It then calls the numbers in parallel, limited only by the maximum number of concurrent sessions supported, and plays a series of interactive voice prompts/messages in response to the called party's responses and records the result in a database, etc.

In another example, a Help Desk application plays a series of interactive voice prompts/messages in response to the called party's responses and possibly connects the call to a live agent as one option, etc. In yet another example, a Stock or Bank Transactions application plays a series of interactive voice prompts/messages in response to the called party's responses and conducts appropriate transactions with a backend database or web application, etc.

Another example is for an IVR to make outbound calls. Many companies have a need to notify customers by telephone. One such example is for an airline to notify passengers of changed flight schedules. An IVR application can be used to automatically dial the passengers listed in a database and play a message to notify the changed flight schedule. In such an application, after connection is made to the receiver, an issue arises that the message played may need to be dependent on who or what picks up the phone. If the receiver is human, a set of interactive messages appropriate for human is played. If the receiver is a voicemail or an answering machine another set of message is played FIG. 2 illustrates schematically a conventional implementation of call progress analysis. A call control module 180 serves to control a call and a call progress analysis module 190 is used to perform call progress analysis. A particular interactive voice response application IVR 192 is used to perform call processing.

In STEP 1, a call would come to the call control module establishing a signaling connection. The call control module would then establish a CPA event connection the CPA module 182 and route the media stream from the call to the CPA module to be analyzed. The CPA module returns a result of the analysis every time it recognizes a predefined pattern in the media stream. In this way, possibly a series of analysis results is returned to the call control module 180.

In STEP 2, when the call control module receives a predefined result within a predetermined time period, it will consider the analysis to be completed and the result final. Basic on the final result, the call control module will initiate a voice application appropriate for the final analysis result. It closes the CPA module and reroutes the media stream from the CPA 180 to the IVR 192 to process the call there.

As can be seen, the conventional implementation of call progress analysis and call processing is piecemeal. CPA is performed until a definite result occurs to identify the appropriate voice application. The identified voice application is then used to process the call. Once this happens, the event interface to the CPA engine and the media connection is no longer in place so no further analysis can be performed.

Figure 3:
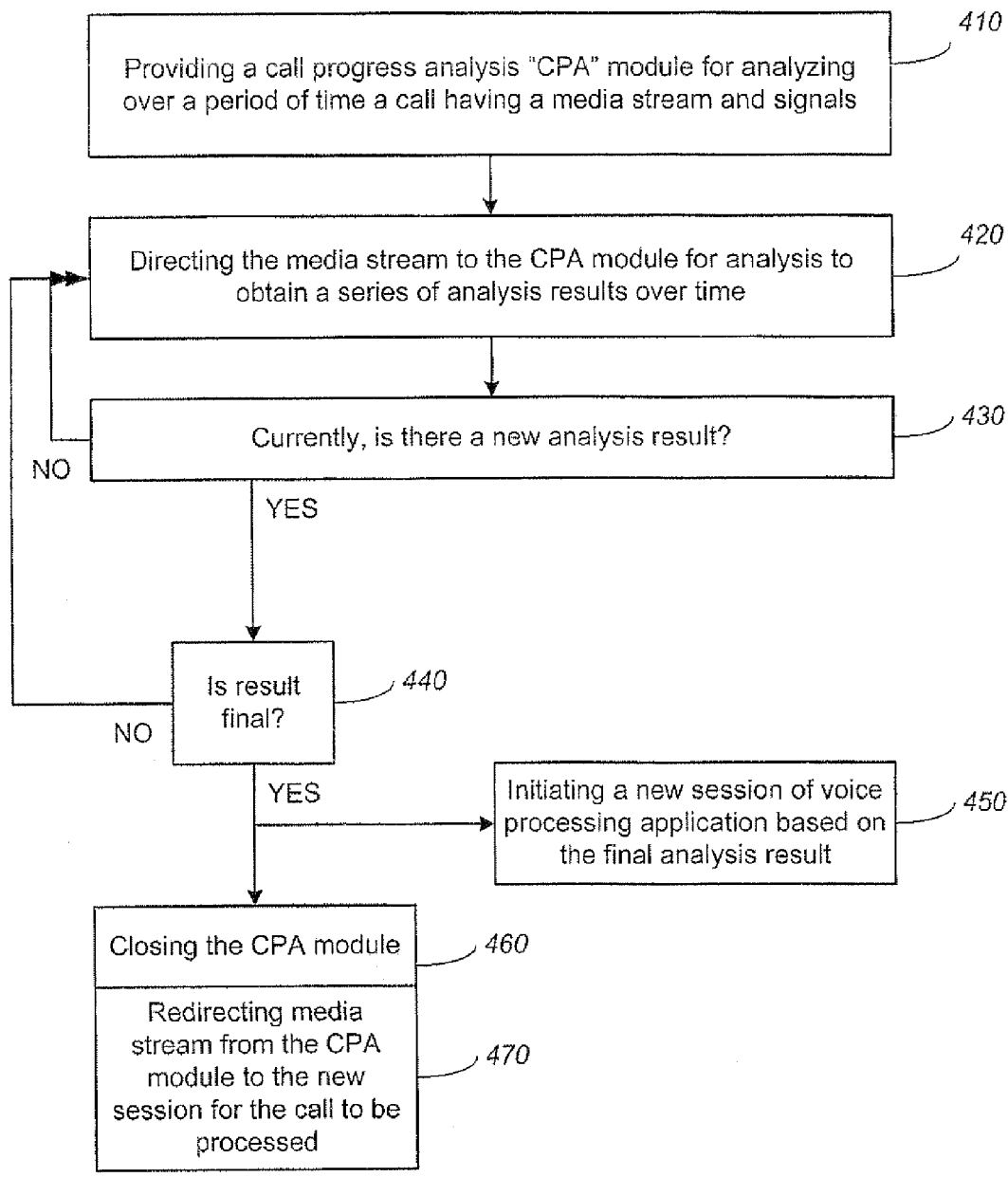
FIG. 3 is a flow diagram illustrating the convention call progress analysis and processing of FIG. 2.

FIG. 3 is a flow diagram illustrating the convention call progress analysis and processing of FIG. 2.

STEP 410: Providing a call progress analysis "CPA" module for analyzing over a period of time a call having a media stream and signals.

STEP 420: Directing the media stream to the CPA module for analysis to obtain a series of analysis results over time.

STEP 430: Currently, is there a new analysis result? If there is no new analysis result, proceeding to STEP 420, otherwise proceeding to STEP 440.

STEP 440: Is the result final? If the result is not final, proceeding to STEP 420, otherwise proceeding in parallel to both STEP 450 and STEP 460.

STEP 450: Initiating a new session of voice processing application based on the final analysis result STEP 460: Close CPA module STEP 470: Redirecting media stream from the CPA module to the new session for the call to be processed.

Conventional CPA/call control implementations cannot recover from an inaccurate analysis result. For example the receiver may sound human as after some analysis results, the call control module 180 concludes that it is a human answering the call. It then sets up a voice application appropriate for human interaction. Later, the receiver may turn out to be an answering machine after all, as confirmed by the beep prompt just prior to recording. However, there is no way for the call control module to know this as the CPA 180 is already closed out. Thus, in such a scenario, the voice interaction is undesirable as the answering machine is only able to record a portion of some messages from an inappropriate voice application.

Figure 4:
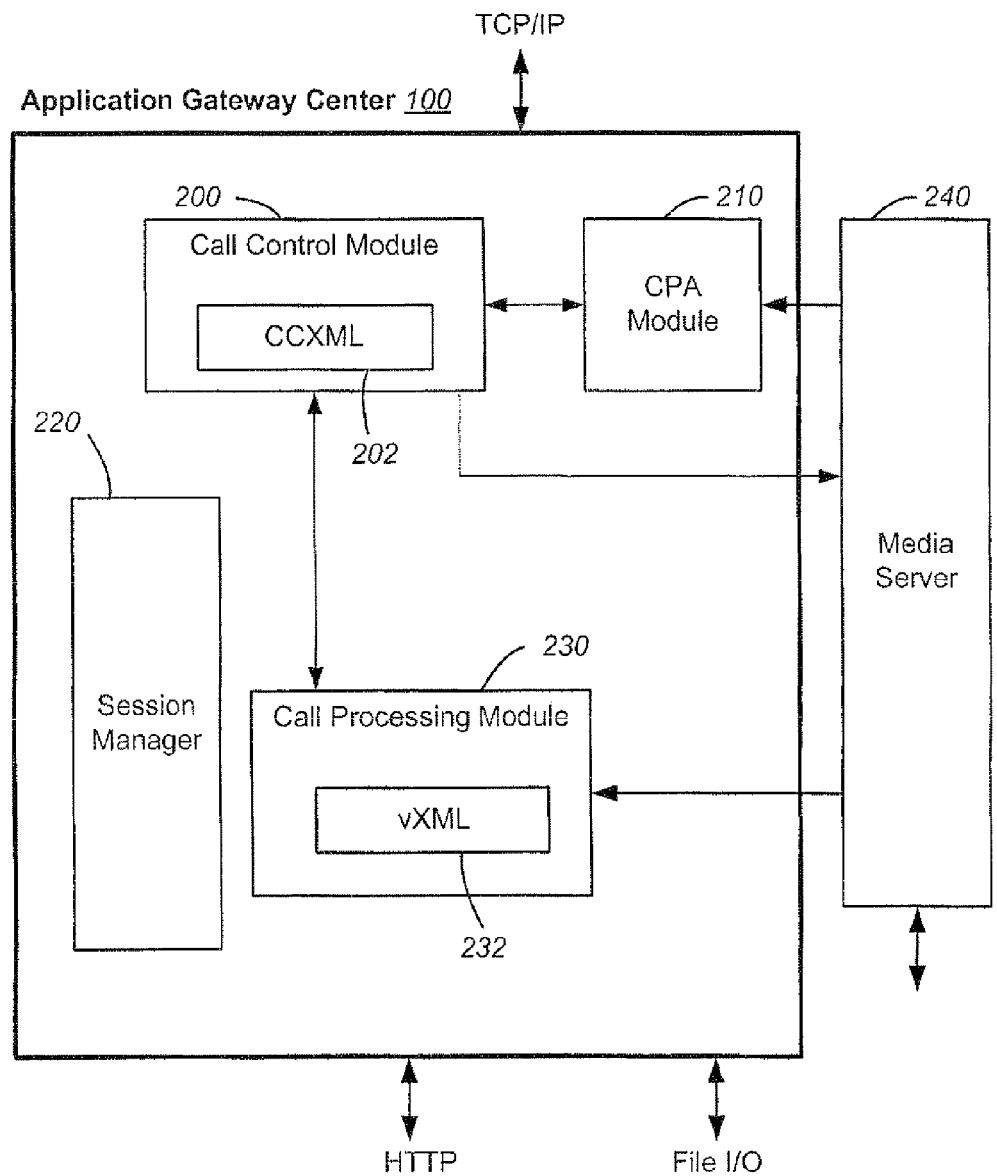
FIG. 4 illustrates a preferred voice application gateway center for performing call progress analysis and call processing.

FIG. 4 illustrates a preferred voice application gateway center for performing call progress analysis and call processing. As described in connection with FIG. 1, the voice application gateway center vAGC 100 is responsible for accepting calls, retrieving the vAPP associated with the dialed number and executing the vXML scripts of the vAPP.

Each call is treated as a separate session and the vAGS is responsible for processing all user events and system actions that occur in multiple simultaneous sessions. The vAGS is also responsible for all call routing in all sessions.

In the preferred embodiment, the vAGS 100 is a set software modules running on a Windows NT or UNIX server. For example, the vAGS is implemented as a Windows machine on a card, and multiple cards are installed on a caged backplane to form a high scalable system.

The vAGS 100 includes a call control module 200, a call progress analysis module 210 a call processing module 220 and a session manager 230.

The call control module 200 includes a CCXML driven engine 202 to perform call control functions. CCXML is the "Call Control eXtensible Markup Language" put out as a standard by the World Wide Web Consortium (W3C) which is the main international standards organization for the World Wide Web. It is an XML based language that can control the setup, monitoring, and tear down of phone calls.

The call progress analysis module 210 is to monitor call progress by examining the media stream and signaling of the call. It is controlled by the call control module 200. It analyzes the media stream of a call and reports back a series of estimated results to the call control module. Typically, at some point in time, the call control module deems a latest result to be sufficiently conclusive that it can close out the call progress analysis module.

The call processing module 230 includes a vXML driven engine 232 to process calls. VoiceXML (vXML) is also put out as a standard by the W3C. It is a standard XML format for specifying interactive voice dialogues between a human and a computer. It allows voice applications to be developed and deployed in an analogous way to HTML for visual applications. The call processing module serves as a "voice browser" to render the vXML script.

The session manager 230 is responsible for creating new sessions, deleting terminated sessions, routing all actions and events to the appropriate modules and maintaining modularity between each session. It responds to I/O and vXML requests and other additional events.

In the preferred embodiment, a media server 240 co-operates with the vAGS 100 to serve and process media associated with calls and voice applications.

Figure 5:
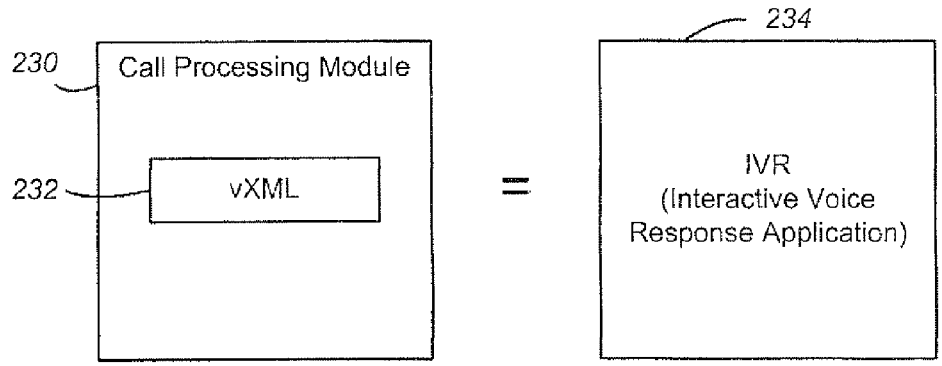
FIG. 5 illustrates the implementation of an interactive voice response application ("IVR") by the call processing module shown in FIG. 4.

FIG. 5 illustrates the implementation of an interactive voice response application ("IVR") by the call processing module shown in FIG. 4. The IVR is implemented by the call processing module 230 driven by an associated vXML script that was retrieved from a web server 112 on the IP network 30 (see also FIG. 1.)

Figure 6:
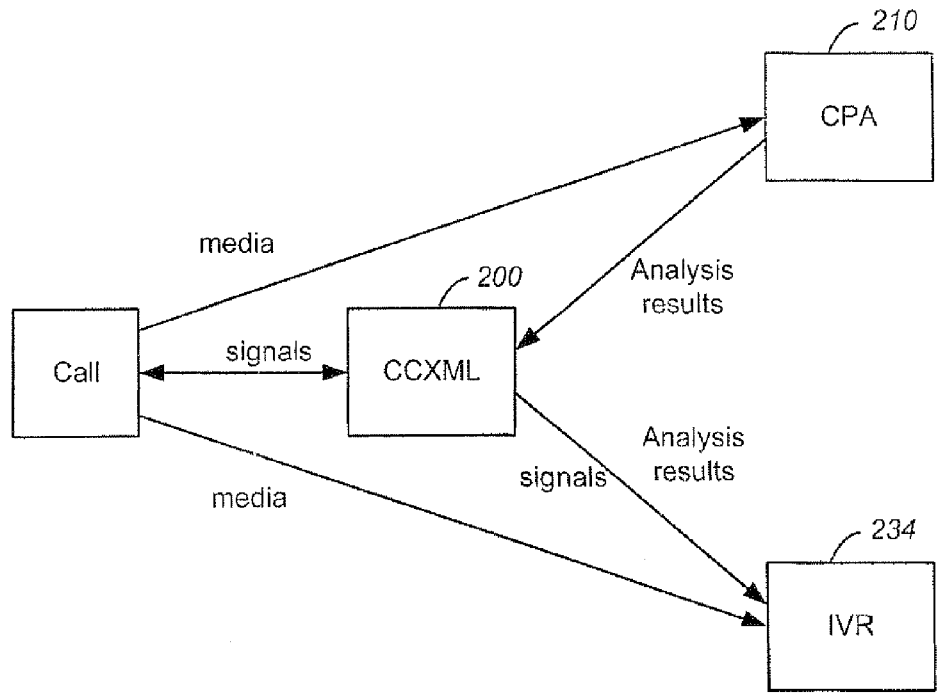
FIG. 6 illustrates schematically an improved scheme for call progress Analysis in cooperation with call processing, according to one preferred embodiment of the invention.

FIG. 6 illustrates schematically an improved scheme for call progress Analysis in cooperation with call processing, according to one preferred embodiment of the invention. The call control module 200 (CCXML) serves to control a call and a call progress analysis module 210 is used to perform call progress analysis. A given interactive voice response application IVR 234 is used to perform call processing. In this scheme the call sends the media stream to both the CPA engine and the IVR platform in parallel, allowing the CPA to perform analysis while the IVR functions are going on. For example, an access server 14 (see FIG. 1) is able to send the media streams in parallel. This allows CCXML to direct the IVR based on updated CPA events which are a series of estimated results of the analysis. For example, the CPA may start off by sending a "human" result and the CCXML application directs the IVR application to play the human message to the receiver of the call. Later on the CPA detects a "beep" event indicating that the recipient should be a "machine", the CCXML on receiving such a result can direct the IVR component to start over and instead play the answering machine message to the receiver.

One preferred implementation is to initially err towards identifying human voice over machine voice. In this way the IVR will initially invoke a vXML application appropriate for human. If the recipient is actually a human, he or she will not be subjected to long delays while the CPA is busying analyzing. If further analysis indicates that the recipient was really a machine, the IVR can restart by invoke a vXML application intended for machines.

In the preferred embodiment, a user can call any phone at any time by issuing an HTTP-based call request to the vAGC. This is a token-initiated call and can be used to deliver from an IVR hosting facility important notification calls, provide outbound customer surveys, collect consumer payments, and implement outbound call center service such as predictive dialers.

Figure 7:
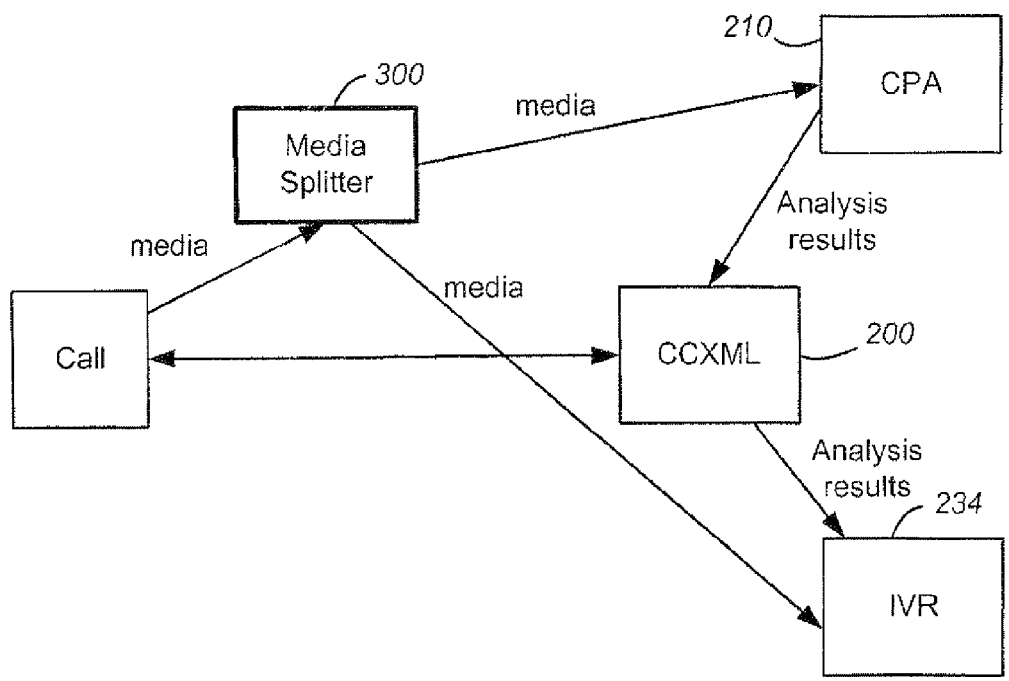
FIG. 7 illustrates schematically an improved scheme for call progress analysis in cooperation with call processing, according to another preferred embodiment of the invention.

FIG. 7 illustrates schematically an improved scheme for call progress analysis in cooperation with call processing, according to another preferred embodiment of the invention. This embodiment has a similar configuration as that of FIG. 6 except the media stream is fed though a media splitter 300 which in turn splits into two parallel media streams, one to the CPA 210 and the other to the IVR 234. For example, referring to FIG. 4, the media server 240 is able to act as the media splitter.

Figure 8:
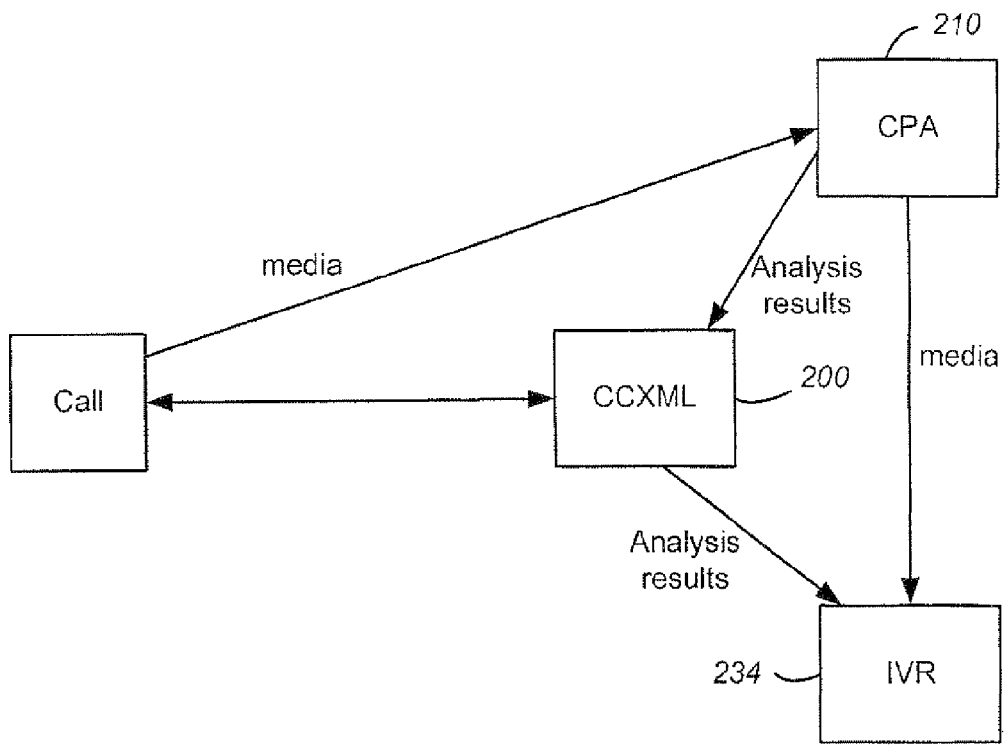
FIG. 8 illustrates schematically an improved scheme for call progress analysis in cooperation with call processing, according to another preferred embodiment of the invention.

FIG. 8 illustrates schematically an improved scheme for call progress analysis in cooperation with call processing, according to another preferred embodiment of the invention. In this embodiment the call sends the media stream to the CPA engine 210 but allows the IVR 234 to receive a copy of the media stream. In this way the CPA can perform analysis while the IVR functions are going on. This allows CCXML 200 to direct the IVR based on updated CPA events which are a series of estimated results of the analysis as in all embodiments described earlier.

Figure 9:
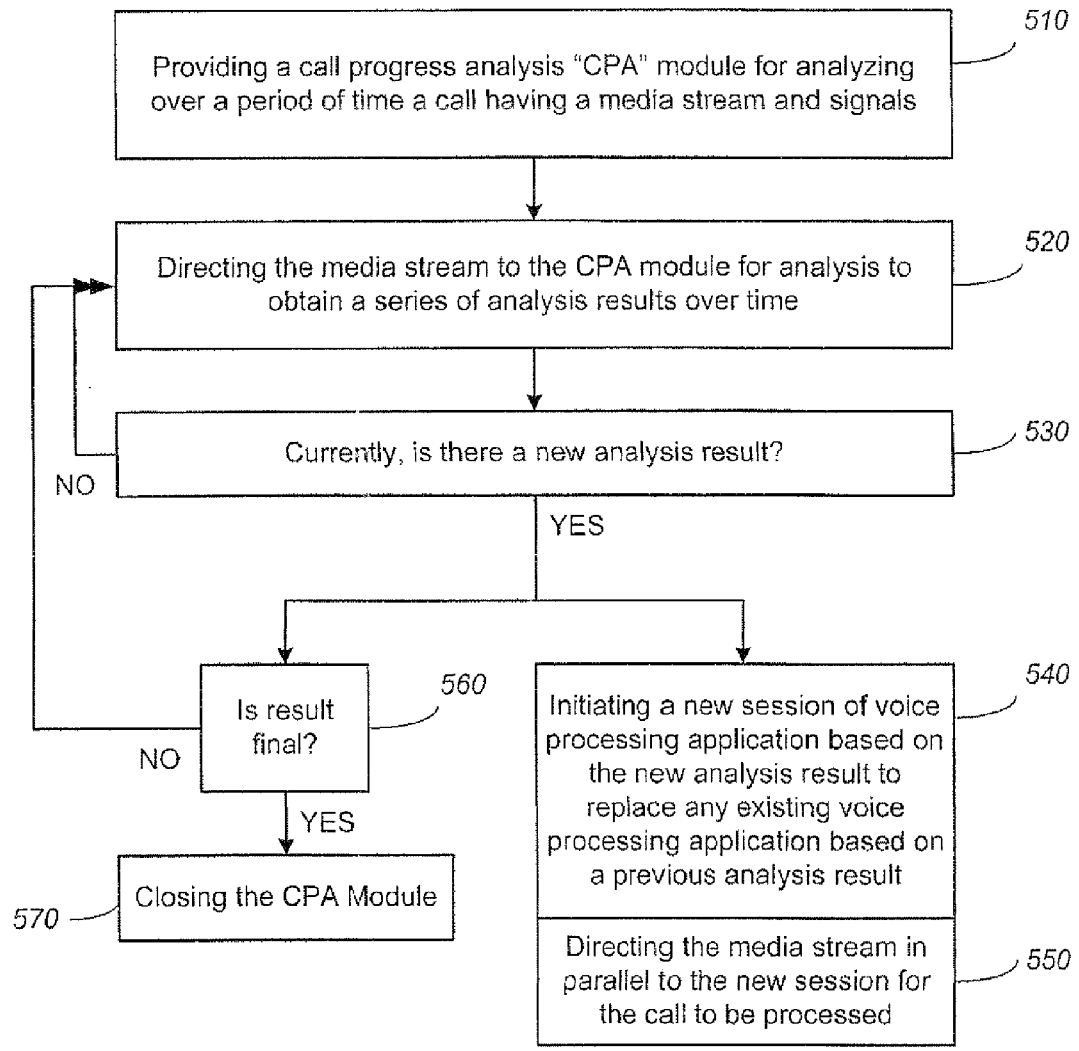
FIG. 9 is a flow diagram illustrating schematically an improved scheme for call progress analysis and call processing, according to a preferred embodiment of the invention.

FIG. 9 is a flow diagram illustrating schematically an improved scheme for call progress analysis and call processing, according to a preferred embodiment of the invention.

STEP 510: Providing a call progress analysis "CPA" module for analyzing over a period of time a call having a media stream and signals.

STEP 520: Directing the media stream to the CPA module for analysis to obtain a series of analysis results over time.

STEP 530: Currently, is there a new analysis result? If there is no new analysis result, proceeding to STEP 520, otherwise proceeding in parallel to both STEP 540 and STEP 560.

STEP 540: Initiating a new session of voice processing application based on the new analysis result to replace any existing voice processing application based on a previous analysis result.

STEP 550: Directing the media stream in parallel to the new session for the call to be processed.

STEP 560: Is the result final? If the result is not final, proceeding to STEP 520, otherwise proceeding to STEP 570.

STEP 570: Closing the CPA module.

Figure 10:
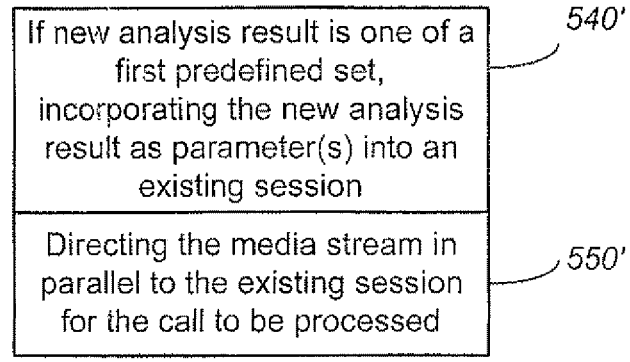
FIG. 10 illustrates another preferred embodiment of the STEP 540 and STEP 550 shown in FIG. 9.

FIG. 10 illustrates another preferred embodiment of the STEP 540 and STEP 550 shown in FIG. 9.

STEP 540': If new analysis result is one of a first predefined set, incorporating the new analysis result as parameter(s) into an existing session.

STEP 550': Directing the media stream in parallel to the existing session for the call to be processed.

Figure 11:
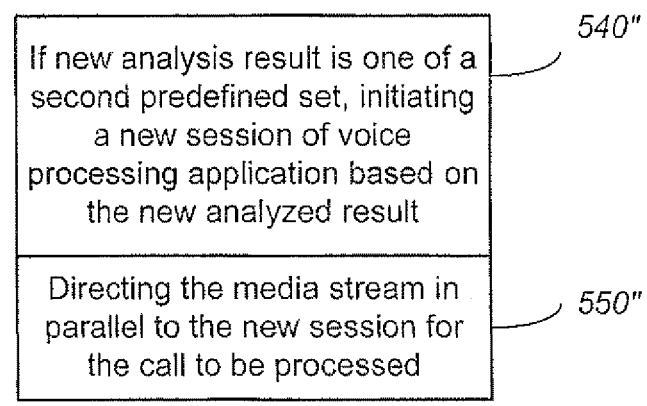
FIG. 11 illustrates another preferred embodiment of the STEP 540 and STEP 550 shown in FIG. 9.

FIG. 11 illustrates another preferred embodiment of the STEP 540 and STEP 550 shown in FIG. 9.

STEP 540": If new analysis result is one of a second predefined set, initiating a new session of voice processing application based on the new analyzed result.

STEP 550": Directing the media stream in parallel to the new session for the call to, be processed.

The improved scheme of call-progress analysis and processing essentially allows parallel operations of the CPA and the IVR. This provides the ability to estimate dynamically if calls are answered by people, answering machines, or voicemail boxes and adaptively respond to the dynamically estimated results with appropriate voice applications in the IVR platform. The preferred embodiments have been described in the context of VOIP in the IP network. However, the invention is equally applicable to transport schemes other that in packet mode such as time-division multiplexing ("TDM") common in the PSTN network.

While the embodiments of this invention that have been described are the preferred implementations, those skilled in the art will understand that variations thereof may also be possible. Therefore, the invention is entitled to protection within the full scope of the appended claims.

The invention claimed is:

1. A method of processing a telephone call having a media stream, comprising:
   a) directing the media stream to a call progress analysis ("CPA") module to obtain a series of analysis results over time, each analysis result belonging to one of a number of predefined sets including a first predefined set associated with a live person and a second predefined set associated with a machine;
   b) concurrently directing the series of analysis results and the media stream to a call processing module;
   c) initiating a voice application session in the call processing module independent of analysis results to process the media stream appropriate for the first defined set;

d) subsequent to initiating the voice application session, whenever an analysis result belonging to the second predefined set is received by the call processing module, modifying the voice application session in the call processing module to process the media stream appropriate for the second defined set; and e) operating the voice application session as modified.

2. A method as in claim 1, wherein:
whenever the new analysis result is one of the second predefined set, modifying the voice application session by incorporating the new analysis result as one or more parameter into the voice application session processing the media stream.

3. A method as in claim 1, wherein:
whenever the new analysis result is one of the second predefined set, modifying an existing voice application session by replacing with a new voice application to process the media stream appropriate for the second predefined set.

4. A method as in claim 1, wherein:
the voice application session in the call processing module to process the media stream appropriate for the second defined set is driven by an interactive voice response application appropriate for interacting with a machine.

5. A method as in claim 4, wherein:
the voice application session in the call processing module to process the media stream appropriate for the first defined set is driven by an interactive voice response application appropriate for interacting with a live person.

6. A method as in claim 3, wherein:
whenever a subsequent analysis result indicates that the media stream is not from a live person, the new session being initiated to replace the existing session is an interactive voice response application appropriate for interacting with a machine generated call.

7. A method as in claim 1, further comprising:
providing a call control module for controlling the call; and
wherein said call control module controls directing the media stream to the CPA module.

8. A method as in claim 1, further comprising:
providing a call control module for controlling the call; and
wherein said call control module receives the series of analysis results from the CPA and relates the results to the call processing module.

9. A method as in claim 1, further comprising:
providing a call control module for controlling the call; and
wherein said call control module controls directing the media stream to the call processing module.

10. A method as in claim 1, further comprising:
providing a media splitter that receives the media stream and relates copies of the media stream to both the CPA module and the call processing module.

11. A call processing system for processing a telephone call having a media stream, comprising:
a call control module to control the call;
a call progress analysis ("CPA") module for analyzing the media stream to obtain a series of analysis results over time, each analysis result belonging to one of a number of predefined sets including a first predefined set associated with a live person and a second predefined set associated with a machine;
a call processing module to process the media stream with a voice application session, said call processing module initially having a voice application session to process the media stream appropriate for the first defined set, independent of analysis results; and wherein:
said call control module concurrently directs the media stream to the CPA module and the media stream and the series of analysis results to said call processing module; and
subsequent to initiating the voice application session, whenever an analysis result belonging to the second predefined set is received by the call processing module, said call processing module modifies the voice application session in the call processing module and operates to process the media stream appropriate for the second defined set until the session is closed.

12. The call processing system as in claim 11, wherein:
whenever the new analysis result is one of the second predefined set, said call processing module modifies the session by incorporating the new analysis result as one or more parameter into the session processing the media stream.

13. The call processing system as in claim 11, wherein:
whenever the new analysis result is one of the second predefined set, said call processing module modifies an existing voice application session by replacing with a new voice application session to process the media stream appropriate for the second predefined set.

14. The call processing system as in claim 11, wherein:
the voice application session in the call processing module to process the media stream appropriate for the second defined set is driven by an interactive voice response application appropriate for interacting with a machine.

15. The call processing system as in claim 14, wherein:
the voice application session in the call processing module to process the media stream appropriate for the first defined set is driven by an interactive voice response application appropriate for interacting with a live person.

16. The call processing system as in claim 13, wherein:
whenever a subsequent analysis result indicates that the media stream is not from a live person, the new voice application session being initiated to replace the existing voice application session is an interactive voice response application appropriate for interacting with a machine generated call.

17. The call processing system as in claim 11, further comprising:
a media splitter that receives the media stream and relates copies of the media stream to both the CPA module and the call processing module.

* * * * *